(12) United States Patent
Balkus, Jr. et al.

(10) Patent No.: US 7,390,452 B2
(45) Date of Patent: *Jun. 24, 2008

(54) ELECTROSPINNING OF POLYMER AND MESOPOROUS COMPOSITE FIBERS

(75) Inventors: Kenneth J. Balkus, Jr., The Colony, TX (US); John P. Ferraris, Coppell, TX (US); Sudha Madhugiri, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 10/385,043

(22) Filed: Mar. 10, 2003

(65) Prior Publication Data

US 2003/0168756 A1  Sep. 11, 2003

Related U.S. Application Data

(60) Provisional application No. 60/362,623, filed on Mar. 8, 2002.

(51) Int. Cl.
*D04H 3/02* (2006.01)
*H05B 7/00* (2006.01)

(52) U.S. Cl. ........................ 264/465; 264/171.1

(58) Field of Classification Search ............ 264/10, 264/122, 171.1, 465
See application file for complete search history.

(56) References Cited

U.S. PATENT DOCUMENTS

| 4,043,331 | A | * | 8/1977 | Martin et al. ............ 602/45 |
| 4,127,706 | A | * | 11/1978 | Martin et al. ............ 264/10 X |
| 4,323,525 | A | | 4/1982 | Bornat ............ 264/441 |
| 4,689,186 | A | | 8/1987 | Bornat ............ 264/6 |
| 6,800,155 | B2 | * | 10/2004 | Senecal et al. ............ 156/62.4 |
| 2003/0017208 | A1 | * | 1/2003 | Ignatious et al. ............ 424/486 |
| 2004/0037813 | A1 | * | 2/2004 | Simpson et al. ............ 424/93.7 |

* cited by examiner

*Primary Examiner*—Leo B Tentoni
(74) *Attorney, Agent, or Firm*—Morgan, Lewis & Bockius LLP

(57) ABSTRACT

The invention is directed to an apparatus and methods for electrospinning composite fibers including polymeric material and mesoporous molecular sieve material. The methods include in one aspect electrospinning fibers from a conducting solution to which a high voltage electric current is applied. The apparatus includes in one aspect one or more conducting solution introduction devices for providing a quantity of conducting solution, the conducting solution introduction devices being electrically charged thereby establishing an electric field between the conduction solution introduction devices and a target, and means for controlling the flow characteristics of conducting solution from the conducting solution introduction devices.

12 Claims, 9 Drawing Sheets

ELECTROSPINNING OF POLYMER AND MESOPOROUS COMPOSITE FIBERS

CROSS REFERENCES TO RELATED APPLICATIONS

This application claims priority to U.S. Provisional Application Ser. No. 60/362,623 filed on Mar. 8, 2002, which is fully incorporated by reference herein.

STATEMENT REGARDING FEDERALLY SPONSORED RESEARCH

The invention was made in part with United States Government support awarded by the National Science Foundation. The U.S. Government has certain rights in the invention.

BACKGROUND OF THE INVENTION

1. Technical Field of the Invention

The present invention relates to methods and apparatus for electrospinning composite fibers comprising at least one polymer and at least one mesoporous material. The present invention also relates to a method of making a mesh or network of organic and inorganic fibers by electrospinning.

2. Description of the Prior Art

The electrospinning process involves the application of a strong electrostatic field to a capillary connected with at least one reservoir containing a conducting solution. Under the influence of the electrostatic field, a pendant droplet of the conducting solution at the capillary tip is deformed into a conical shape. If the voltage surpasses a threshold value, electrostatic forces overcome the surface tension, and a fine charged jet is ejected. The jet moves towards a ground plate acting as an electrode. The solvent begins to evaporate immediately after the jet is formed. The result is the deposition of thin fibers on a substrate in front of the electrode.

Electrospinning makes it relatively easy to spin continuous nanofibers from many different materials including, but not limited to, polymers. Electrospinning provides a straightforward and practical way to produce fibers with diameters ranging from few to about 2000 nm. These small fibers can support arrays of nanomachines and connect integrated arrays of nanomachines to larger scale systems.

U.S. Pat. No. 4,323,525, which is fully incorporated by reference herein, is directed to a process for the production of tubular products by electrostatically spinning a liquid containing a fiber-forming material. The process involves introducing the liquid into an electric field through a nozzle, under conditions to produce fibers of the fiber-forming material, which tend to be drawn to a charged collector, and collecting the fibers on a charged tubular collector which rotates about its longitudinal axis, to form the fibrous tubular product. It is also disclosed that several nozzles can be used to increase the rate of fiber production.

U.S. Pat. No. 4,689,186, which is fully incorporated by reference herein, is directed to a process for the production of polyurethane tubular products by electrostatically spinning a fiber-forming liquid containing the polyurethane. It is disclosed that auxiliary electrodes can be placed around the collector to help facilitate collection of the fibers. It is disclosed that the auxiliary electrodes can be arranged to facilitate separation or to prevent adhesion of the formed fibers.

The present invention relates to a method of making a network of fibers comprising polymer fibers and mesoporous molecular sieve fibers, by electrospinning. The network or mesh of non-woven fibers thus produced displays properties that are not present in the fibers prepared using only polymers or only mesoporous molecular sieves. The above mentioned references do not teach or suggest the production of polymer and mesoporous molecular sieve composite fibers. These composite fibers have numerous commercial applications including, but not limited to, use in sensors and biosensors, scaffolds for cell growth for artificial skin or bone, optical and electronic devices, nanotube composites, solar cells, fuel cells, smart textiles and paper. The electrospun polymer fibers discussed in the prior art cannot be substituted in place of the composite fibers used in the above-referenced applications. Thus, there is a need for developing electrospinning methods for producing composite fibers comprising polymers and mesoporous molecular sieves.

SUMMARY OF THE INVENTION

According to the present invention, it has now been found that composite fibers comprising at least one polymer and at least one mesoporous molecular sieve can be produced by an electrospinning process.

An embodiment of the invention provides a method for electrospinning a fiber from a conducting solution comprising, establishing an electric field between a conducting solution introduction device and a target, feeding said conducting fluid from a reservoir to the conducting solution introduction device, forming a jet of said conducting solution, applying an electric current to said jet to form fibers, and, collecting said fibers on a target, wherein said conducting solution is a combination of at least one polymer and at least one mesoporous material.

In one aspect, the invention relates to a method for electrospinning fibers from a conducting solution to which a high voltage electric current is applied. The conducting solution comprises a combination of at least one polymer and at least one mesoporous precursor material. The polymer and mesoporous precursor material are placed in separate reservoirs as indicated in FIG. 1.

Preferably, the method includes feeding the conducting solution to a conducting solution introduction device at a controlled rate. The rate can be controlled by maintaining the conducting fluid at a constant pressure or constant flow rate. In certain embodiments of the invention, the conducting solution introduction device comprises a needle attached to each of the separate reservoirs containing polymer and mesoporous precursor material respectively. In other embodiments of the invention, the conducting solution introduction device comprises a glass pipette attached to each of the separate reservoirs containing polymer and mesoporous precursor material, respectively.

In an embodiment of the invention, the method also involves controlling the electrical field strength at the needle tip to provide a controlled diameter fiber.

In another aspect, the invention relates to a method for electrospinning fibers from a conducting fluid comprising at least one polymer and at least one mesoporous precursor material in the presence of an electric field established between a conducting fluid introduction device and a ground source, which includes:

a) forming an electrospinning jet stream of the conducting fluid; and, b) electrically controlling the flow characteristics of the jet stream.

An aspect of the invention provides an electrospinning apparatus comprising one or more conducting solution introduction devices for providing a quantity of conducting solution, said conducting solution introduction devices being electrically charged thereby establishing an electric field between said conducting solution introduction devices and a target; and means for controlling the flow characteristics of conducting solution from said one or more conducting solution introduction devices.

The flow characteristics of the jet stream can be electrically controlled by at least one electrode.

Preferably, the means for independently controlling the flow characteristics includes at least one electrode disposed adjacent to the conducting fluid introduction device.

The means for independently controlling the flow characteristics can include a means for individually electrically turning on and off a respective conducting fluid introduction device.

The electrospinning apparatus will preferably include a pump system or a pressure source for supplying different conducting fluids to at least two individual conducting fluid introduction devices.

An embodiment of the invention provides a method of making a network of fibers, wherein said network comprises a composite of polymer fibers and mesoporous molecular sieve fibers, and said fibers are produced by electrospinning.

The present invention provides an apparatus and methods for producing composite fibers comprising polymer and mesoporous molecular sieves by electrospinning.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the invention presented herein.

DETAILED DESCRIPTION OF ILLUSTRATIVE EMBODIMENTS

The present invention is directed to an apparatus for producing composite electrospun fibers comprising polymers and mesoporous materials, and composite fibers produced by electrospinning.

The present invention is also directed to an apparatus and methods for producing composite fibers by electrospinning a plurality of polymeric and mesoporous fibers simultaneously.

The present invention is further directed to a method of making a network of fibers comprising polymer fibers and mesoporous molecular sieve fibers, by electrospinning. The network or mesh of non-woven fibers thus produced displays properties that are not present in the fibers prepared using only polymers or only mesoporous molecular sieves. For example, the optical properties of the electroluminescent polymer, poly(2-methoxy, 5 ethyl (2' hexyloxy) para-phenylene vinylene) (MEH-PPV) change when electrospun with molecular sieves. Similarly, the brittleness of molecular sieve fibers is minimized when they are electrospun with polymers.

The electrospinning process is driven by the electrical forces on free charges on the surface or inside a conducting solution. In conventional spinning, the fiber is subject to tensile, rheological, gravitational, inertial and aerodynamic forces. In electrospinning, the tensile force is generated by the interaction of an applied electric charge carried by the jet rather than by the spindles and reels in conventional spinning. Electrical forces in non-axial directions are also important.

By "flow characteristics" (of the conducting solution) is meant the jet formation and jet acceleration of the conducting solution which exits from the conducting solution introduction device, e.g., the needle tip or glass pipette tip, as well as the directional flow of the jet stream in three dimensional space. Thus, controlling the flow characteristics can include controlling jet formation, controlling jet acceleration, directing the jet stream to a desired target in three dimensional space, steering the jet stream to different targets during the spinning process or a combination of these.

The invention is directed to methods and apparatus for electrospinning composite fibers from a conducting solution comprising a polymeric material and a mesoporous molecular sieve precursor material.

Figure 1:
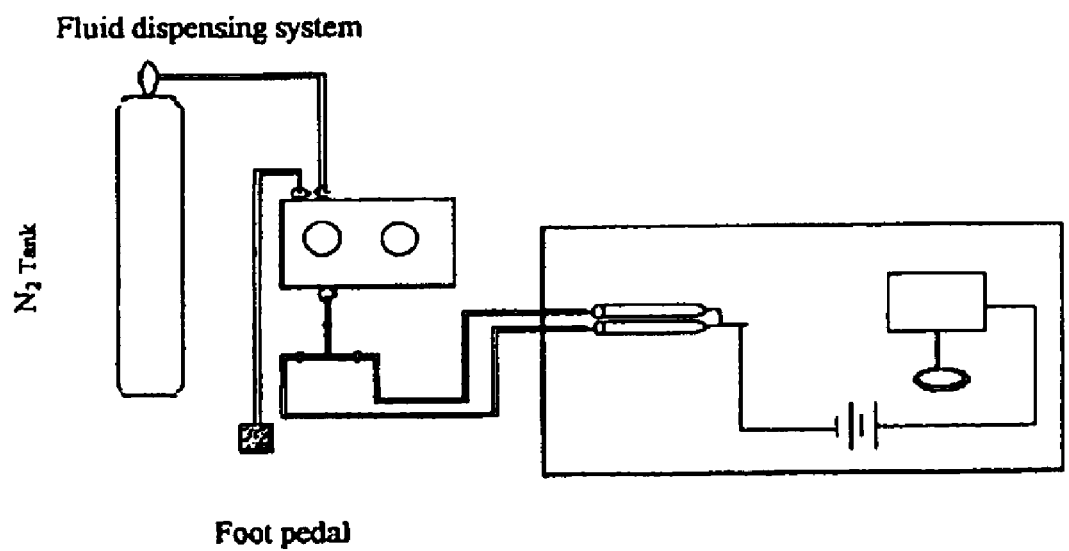
FIG. 1 represents a schematic representation of the electrospinning apparatus.

An aspect of the invention provides an electrospinning apparatus comprising one or more conducting solution introduction devices for providing a quantity of conducting solution, said conducting solution introduction devices being electrically charged thereby establishing an electric field between said conducting solution introduction devices and a target; and means for controlling the flow characteristics of conducting solution from said one or more conducting solution introduction devices. A preferred embodiment of the claimed apparatus is shown in FIG. 1.

The flow characteristics of the jet stream can be electrically controlled by at least one electrode.

Preferably, the means for independently controlling the flow characteristics includes at least one electrode disposed adjacent to the conducting fluid introduction device.

The means for independently controlling the flow characteristics can include a means for individually electrically turning on and off a respective conducting fluid introduction device.

The electrospinning apparatus will preferably include a pump system or a pressure source for supplying different conducting fluids to at least two individual conducting fluid introduction devices.

The conducting solution comprises a combination of at least one polymer material and at least one mesoporous precursor material described more fully below. The term "polymer" and "polymeric material" are used interchangeably herein. As used herein, the term "mesoporous precursor material" refers to the precursor materials used in the synthesis of molecular sieves, including but not limited to, gels prepared with surfactants, as discussed further below. The polymer material and mesoporous precursor material are preferably placed in separate reservoirs.

In an aspect of the invention, the mesoporous precursor material is placed in a reservoir. In this aspect, the mesoporous molecular sieve fibers are formed in situ during the electrospinning process.

In certain embodiments of the invention, the polymer material and mesoporous precursor material are first dissolved in appropriate solvents that are capable of dissolving the polymer and mesoporous precursor material respectively, and providing a conducting solution capable of being electrospun.

In an aspect of the invention, the polymer material is dissolved in a suitable solvent before placement in a reservoir. In another aspect of the invention, the polymer material is melted prior to placement in a reservoir.

Each of the polymer material and mesoporous precursor material is fed to an introduction device at a controlled rate. The rate can be controlled by maintaining the conducting solution, i.e., the combination of at least one polymer material and at least one mesoporous precursor material, at a constant pressure or constant flow rate. In certain embodiments of the invention, the introduction device comprises a needle attached to each of the separate reservoirs containing polymer and mesoporous precursor material, respectively. In an embodiment of the invention, the needle is a metal needle with a flat tip. In other embodiments of the invention, the introduction device comprises a glass pipette attached to each of the separate reservoirs containing polymer and mesoporous precursor material, respectively.

The reservoirs containing the polymer and mesoporous precursor material respectively, are placed in close proximity to one another, such that the conducting solution introduction devices attached to each reservoir are placed in close proximity to one another. In certain embodiments of the invention, the conducting solution introduction devices attached to the reservoir containing the polymer and mesoporous precursor material respectively are placed less than about 5 mm apart.

In order to create an electric field, at least one negative (or positive) electrode is introduced to the one or more conducting solution introduction devices, and at least one positive (or negative) electrode is introduced to a target in the collection region. The collection region is where the jet of conducting fluid is stopped. A target is provided in the collection region to collect the electrospun fibers. The target is preferably located in front of the electrode in the collection region. In certain embodiments of the invention, the electrode in the collection region can also serve as a target.

A suitable target can be a metal screen, mechanical reel or aerodynamic current. Suitable targets also include rotating barrels which can be used to wind the fibers in a yarn-like form. For polymers dissolved in non-volatile solvents, water or other appropriate aqueous liquids can be used to collect the jet, remove the solvent, and coagulate the composite fibers.

Typical solvents that dissolve the polymer material include, but are not limited to, a solvent selected from N,N-Dimethyl formamide (DMF), tetrahydrofuran (THF), methylene chloride, dichloroethane, dioxane, ethanol, chloroform, water or mixtures of these solvents.

The mesoporous precursor material may be dissolved in a solvent selected from hydrochloric acid (HCl), ethanol, water or mixtures of these solvents.

The conducting fluid can optionally contain a salt which creates an excess charge effect to facilitate the electrospinning process. Examples of suitable salts include NaCl, $KH_2PO_4$, $K_2HPO_4$, $KIO_3$, KCl, $MgSO_4$, $MgCl_2$, $NaHCO_3$, $CaCl_2$ or mixtures of these salts.

The conducting fluid can optionally contain carbon nanotubes, which become charged and facilitate fiber formation.

The apparatus and methods according to the invention can be used for electrospinning any fiberizable material, including but not limited to, a mixture of polymeric and mesoporous precursor material. Examples of polymers include, but are not limited to, poly(lactic acid) (PLA), poly(glycolic acid) (PGA), poly(ethylene oxide) (PEO), nylon, polyesters, polyamides, poly(amic acids), polyimides, polyethers, polyketones, polyurethanes, polycaprolactones, polyacrylonitriles, polyaramides, conjugated polymers such as the electroluminescent polymer, poly(2-methoxy, 5 ethyl (2' hexyloxy) para-phenylene vinylene) (MEH-PPV), polyphenylenevinylenes, polyarylene-vinylenes, polythienolene-vinylenes, polypyrrolo-vinylenes, polyheteroarylene-vinylenes, polyanilines, polyphenylenes, polyarylenes, polythiophenes, polypyrroles, polyheteroarylenes, polyphenylene-ethynylenes, polyarylene-ethynylenes, polythieno-ethynylenes, polyheteroarylene-ethynylenes, and mixtures thereof. Examples of mesoporous precursor materials include, but are not limited to materials which comprise gels prepared with surfactants. The list of surfactants include, but are not limited to, pluronic P-123, pluronic F-127, pluronic F-77, pluronic P-104, pluronic F-38, pluronic L-121 and mixtures thereof. Other surfactants that can be used in embodiments of the present invention include, but are not limited to, Vitamin E alphatocopherylpolyethylene glycol 1000 succinate (Vitamin E TPGS), Tergitols, Triton-X, polyethylene glycol (different molecular weights), alkyl ammonium halides, alkyl amines and mixtures thereof. Examples of mesoporous precursor materials additionally include, but are not limited to, materials comprising metal oxides such as silicon dioxide ($SiO_2$), aluminium oxide ($Al_2O_3$), titanium dioxide ($TiO_2$), niobium oxide ($Nb_2O_5$), tungsten oxide ($WO_3$), tantalum oxide ($Ta_2O_5$), vanadium pentoxide ($V_2O_5$) and mixtures thereof, as well as, electrically conducting mixed metal oxides including, but not limited to, indium tin oxide, calcium aluminate and mixtures thereof.

In an embodiment of the invention useful for preparing composite fibers having utility in medical applications, the polymer is a biodegradable and/or bioabsorbable polymer which contains a monomer selected from the group consisting of a glycolid, lactide, dioxanone, caprolactone and trimethylene carbonate. By the terminology "contains a monomer" is intended a polymer which is produced from the specified monomer(s) or contains the specified monomeric unit(s). The polymer can be a homopolymer, random or block co-polymer or heteropolymer containing any combination of these monomers. The material can be a random copolymer, block copolymer or blend of homopolymers, copolymers, and/or heteropolymers that contains these monomers.

In one embodiment, the biodegradable and/or bioabsorbable polymer contains bioabsorbable and biodegradable linear aliphatic polyesters such as polyglycolide (PGA) and its random copolymer poly(glycolide-co-lactide) (PGA-co-PLA). The Food and Drug Administration has approved these polymers for use in surgical applications, including medical sutures and scaffold for tissue building. An advantage of these synthetic absorbable materials is their degradability by simple hydrolysis of the ester backbone in aqueous environments, such as body fluids. The degradation products are ultimately metabolized to carbon dioxide and water or can be excreted via the kidney. These polymers are very different from cellulose based materials, which cannot be absorbed by the body.

Other examples of suitable biocompatible polymers are polyhydroxyalkyl methacrylates including ethylmethacrylate, and hydrogels such as polyvinylpyrrolidone, polyacrylamides, etc. Other suitable bioabsorbable materials are biopolymers which include collagen, gelatin, alginic acid, chitin, chitosan, fibrin, hyaluronic acid, dextran and polyamino acids. Any combination, copolymer, polymer or blend thereof of the above examples is contemplated for use according to the present invention. Such bioabsorbable materials may be prepared by known methods.

Particularly useful biodegradable polymers include polylactides, poly-glycolides, polycarprolactone, polydioxane and their random and block copolymers. Examples of specific polymers include poly D,L-lactide, polylactide-co-glycolide (85:15) and polylactide-co-glycolide (75:25).

Preferably, the biodegradable polymers discussed above will have a molecular weight in the range of about 1,000 to about 1,000,000 g/mole, more preferably about 4,000 to about 250,000 g/mole. Blends of different molecular weight polymers are also contemplated. A small percentage of a low molar mass monomer can also be added to the higher molar mass polymer.

The electric field created in the electrospinning process will preferably be in the range of about 5 to about 100 kilovolts (kV), more preferably about 10 to about 50 kV. The feed rate of the conducting fluid to the spinneret (or electrode) will preferably be in the range of about 0.1 to about 1000 microliters/minute, more preferably about 1 to about 250 microliters/minute.

The conducting solution is supplied to one or more conducting solution introduction devices by a pump system or a pressure source. The pressure source is preferably a nitrogen source, whose pressure can be controlled by a foot-pedal. Application of a low pressure to the conducting solution ensures a steady flow of the solution to the conducting solution introduction device.

The properties of the resulting composite fibers produced by electrospinning will be affected by the electric and mechancial properties of the conducting fluid. The conductivity of the macromolecular solution can be drastically changed by adding ionic inorganic/organic compounds. The magneto-hydrodynamic properties of the fluid depend on a combination of physical and mechanical properties, (e.g., surface tension, viscosity and viscoelastic behavior of the fluid) and electrical properties (e.g., charge density and polarizability of the fluid). For example, by adding a surfactant to the polymer solution, the fluid surface tension can be reduced, so that the electrostatic fields can influence the jet shape and the jet flow over a wider range of conditions. By coupling a pump system or pressure source that can control the flow rate either at constant pressure or at constant flow rate, the effect of viscosity of the conducting fluid can be alleviated.

In another preferred embodiment for producing composite fibers according to the present invention, the jet stream flight is also precisely controlled.

It is believed that a change in charge density (through the addition of salts) can significantly affect the fiber diameter. Thus, it is believed that higher excess charge density generally favors the production of thinner fibers and lower excess charge density favors the production of thicker fibers. Several other kinds of salts (e.g. NaCl, $KH_2PO_4$, KIO and $K_3PO_4$), which are all biologically compatible to the body, are also contemplated.

An embodiment of the invention provides a method of making a network of fibers, wherein said network comprises a composite of polymer fibers and mesoporous molecular sieve fibers, and said fibers are produced by electrospinning. The network or mesh of non-woven fibers thus produced displays properties that are not present in the fibers prepared using only polymers or only mesoporous molecular sieves. For example, the optical properties of MEH-PPV changes when it is electrospun with a mesoporous molecular sieve like SBA-15. Similarly, electrospun fibers prepared using only molecular sieve are brittle, whereas the composite prepared with molecular sieves and polymers produces a paper-like mesh that can be easily handled.

The methods and apparatus according to the invention are capable of producing fibers having diameters in the range from less than 10 up to about 1,000 nanometers, more preferably about 20 to about 500 nanometers.

It is also possible to produce composite fibers having different diameters with a controlled percentage of sub-micron diameter fibers.

Optionally, additives, e.g., one or more medicinal agents, can be incorporated into the fibers produced in accordance with the invention. The additives can be mixed with the fiberizable material, e.g., polymer, prior to formation of the fibers. Furthermore, additives, such as medicinal agents, can also be placed within the pores of fibers comprising mesoporous materials.

The chemical composition of the composite fibers, i.e., specific polymers or blends of polymers, and the fiber diameter be controlled to provide selectable performance criteria. The composite fibers can also contain a plurality of fibers which have different medicinal agents or different concentrations of medicinal agents. Such composites offer unique treatment options with combinations of medicinal agents and release profiles.

WORKING EXAMPLES

The process of Electrospinning:

In the process of electrospinning, a high voltage electric current (20 kV) is applied to a solution, which causes a jet of the solution to form. The jet divides into many fibers, which divide and redivide to form a network of fibers. These are attracted to the oppositely charged electrode attached to a target. The fibers so formed are collected on the target.

Apparatus:

The polymer solution used, was prepared by stirring and sonicating a 7-10 wt % of the polymer in 1,2-dichloroethane. The gel for the mesoporous material SBA-15 is prepared as described later, and used for electrospinning. The gels prepared are transferred to clear barrels (which look like a syringe barrel without the plunger), which are part of a fluid dispensing system (EFD 1500 XL). Using the fluid dispensing system ensures steady flow of the gels. A needle with a cut tip was attached to one end of the barrel containing the gel for the mesoporous material. Another needle which is bent in the form of the letter 'Z' is attached to the barrel containing the polymer solution. The needles which are straight or bent can be interchanged between the syringe barrels. In addition, any number of solutions can technically be used in a similar way with minor modifications.

A nitrogen source, whose pressure can be controlled by a foot-pedal, was attached to the other ends of the plastic barrels. A glass 'T' is used to split the source of the nitrogen outlet. A low nitrogen pressure is applied to the gel to ensure a steady flow of the viscous gel. The two syringe barrels are placed one above the other in such a way that the needles are in close proximity to each other. A single negative electrode is attached to the needles and the positive electrode is attached to the target. A distance of 20-25 cm was maintained between the tip of the syringe and the target. The syringe barrels with needles, and the target, which get exposed to high voltages are placed in a plexi-glass box for safety purposes. The schematic of the entire set up is shown in FIG. 1.

Gel Preparation and Electrospinning Process:

(a) MEH-PPV Fibers:

The polymer MEH-PPV with a molecular weight 292,000 (Pd=1.04) was dissolved in 1,2-dichloroethane to make a 7-10 wt % solution. This was taken in the plastic barrel which is part of the fluid dispensing system and a voltage of 20 kV was applied. The fibers of MEH-PPV formed were collected on to an aluminum substrate.

(b) Gel Preparation for SBA-15:

Triblock copolymers of polyethylene oxide and polypropylene oxide (P-123), tetramethylorthosilicate (TMOS), ethanol, 2M HCl, and $H_2O$ were used in the molar ratios of 0.002644:0.0600:0.2605:0.00822:0.1044 for this gel. Required amount of P-123 was dissolved in ethanol and 2M HCl and water were added dropwise under constant stirring. The silica source, TMOS was then added drop wise under constant stirring to form a clear solution. The solution was transferred to a beaker and was heated at 60-70° C. until the desired viscosity is obtained. A 10 ml of the solution usually was heated for about an hour to obtain the desired viscosity. When heated, the ethanol slowly evaporates and partial hydrolysis and condensation of silica occurs forming a clear and viscous gel, which was then used for electrospinning.

Different organosilanes were partially substituted in spinning the composite fibers. The organosilanes tried were phenyltrimethoxy silane, p-aminophenyltrimethoxy silane. Phenyltrimethylchlorosilane (PTMCS) and trimethylchlorosilane (TMCS) were also partially substituted in the gel to make the gel more hydrophobic and to increase the interaction between the polymer and inorganic material.

(c) SBA-15/MEH-PPV Composite Fibers:

The gels for the two different types of fibers were taken in two different plastic barrels and set up as explained previously and a potential of 20 kV was applied. The fibers obtained were collected on to a target.

Aluminum foil, which is of low cost and easily available, was used as a target to collect the fibers. However, owing to the conditions under which the SBA-15 gel was prepared, very few SBA-15 fibers were formed. To improve the condensation of the SBA-15 fibers, other substrates were tried. Anapore filters with 200 nM pores and 20 nM pores were dipped in 2M HCl for 1 h and dried at 70° C. for 50-60 minutes. These HCl treated anapore filters were attached to the aluminum foil and fibers were spun on to these filters. The HCl in the pores facilitated the condensation of silica in the gel to form fibers.

(d) Precursor Gel Preparation for $TiO_2$ Fibers:

The gel for $TiO_2$ was prepared by dissolving a triblock copolymer of polyethylene oxide and polypropylene oxide ($PO_{70}EO_{20}PO_{70}$) commercially known as P-123 (BASF) in ethanol and hydrolyzing and condensing a titanium source in an acidic medium. The conditions were optimized to form a viscous gel suitable for electrospinning. In a typical gel preparation, 2 g of P-123 was dissolved in 4 gm of ethandl. To this a suspension of 0.01 moles of $Ti(O''C_4H_9)_4$ in 2 gm of ethanol was added followed by 0.5 gm of concentrated HCl. 1 ml of deionized water was added to the above mixture and stirred for 20-30 min at room temperature. The clear gel obtained was heated at a temperature of 45-50° C. for 5-6 h to obtain a clear viscous gel.

The gel obtained in the above said manner was taken in a plastic barrel part of the fluid dispension system and a voltage of 20 kV was applied. The fibers formed were collected on an aluminum foil which acted as a target placed at a distance of 22 cm. The fibers obtained were heated at 130° C. to facilitate the cross linking between titanium and oxygen. Furthermore, these fibers were calcined at 600° C. to remove the template (P-123). The fibers were found to be stable even after calcining at 900° C. We propose a mesoporous framework structure for these with anatase crystallized in the walls which transforms to rutile after heating to temperatures beyond 800° C.

(e) TiO2/MEH-PPV/CNTs Composite Fibers:

The gel obtained for $TiO_2$ was composited with the polymer MFH-PPV. The precursor gel for $TiO_2$ fibers and the polymer solution in 1,2-dichloroethane were taken in two different plastic barrels as illustrated in FIG. 1. A potential of 20 kV was applied to it and the composite fibers formed were collected on aluminum foil which served as a target. The composite fibers were also heated at 130° C. to facilitate the cross linking of titanium and oxygen. Carbon nanotubes (CNTs) were dispersed in MEH-PPV solution and this was also used to prepare composite fibers with $TiO_2$.

(f) PEI/SBA-15 Composite Fibers:

Composite fibers were also prepared by using polyethyleneimine (PEI) (MW=215,000) and SBA-15. A 10 wt % solution of PEI was prepared in methanol and the precursor gel for SBA-15 was prepared as explained before. The two gels were taken in two different plastic barrels as shown in FIG. 1. A potential of 20 kV was applied to it. PEI forms spider web like structures and so it was possible to pick up the composite fiber mesh. A dye 7-hydroxy coumarin (umbelliferone) was added to the SBA-15 gel and composite fibers of PEI and SBA-15 with the dye were also prepared.

Characterization of Composite Fibers:

The morphology, density and thickness of the fibers were examined using scanning electron microscope. The powder X-ray diffraction was used to characterize the extent of ordering in the electrospun materials.

Figure 2:
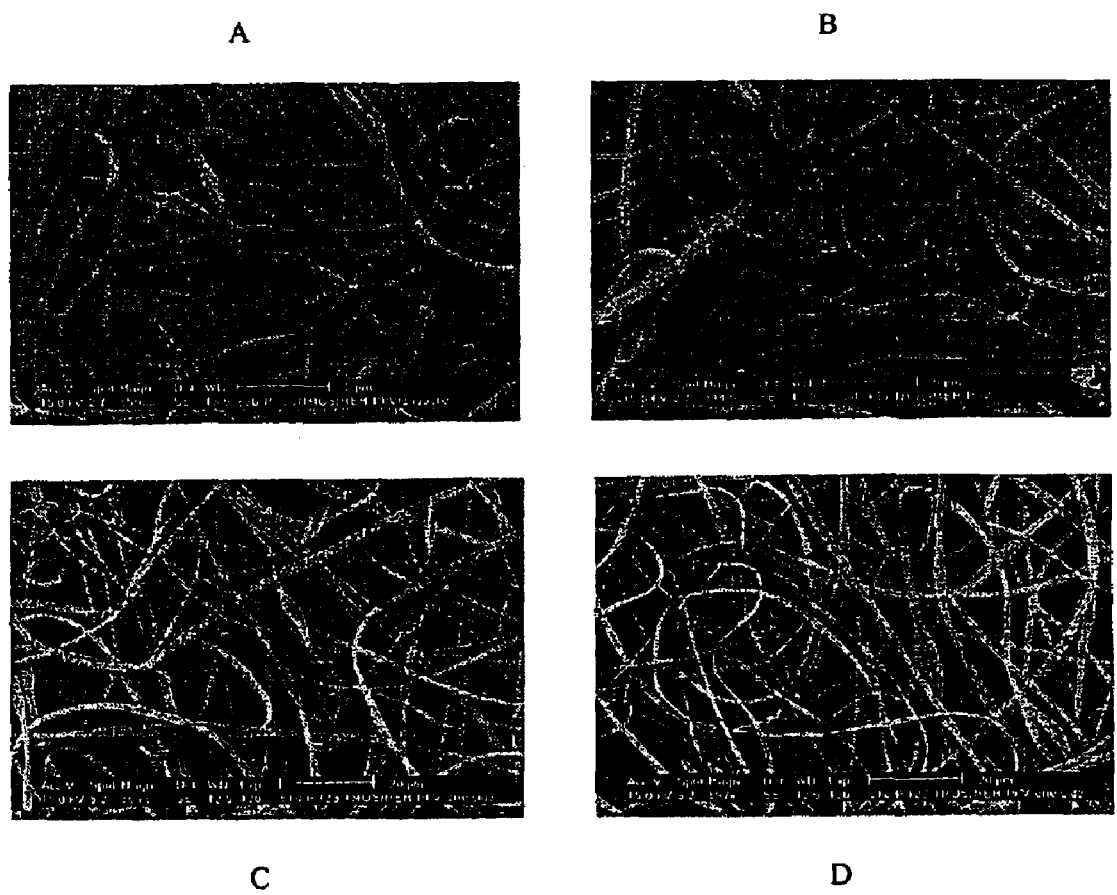
FIGS. 2A-2D represents scanning electron micrographs (SEM) images of MEH-PPV/SBA-15 composite fibers.
Figure 3:
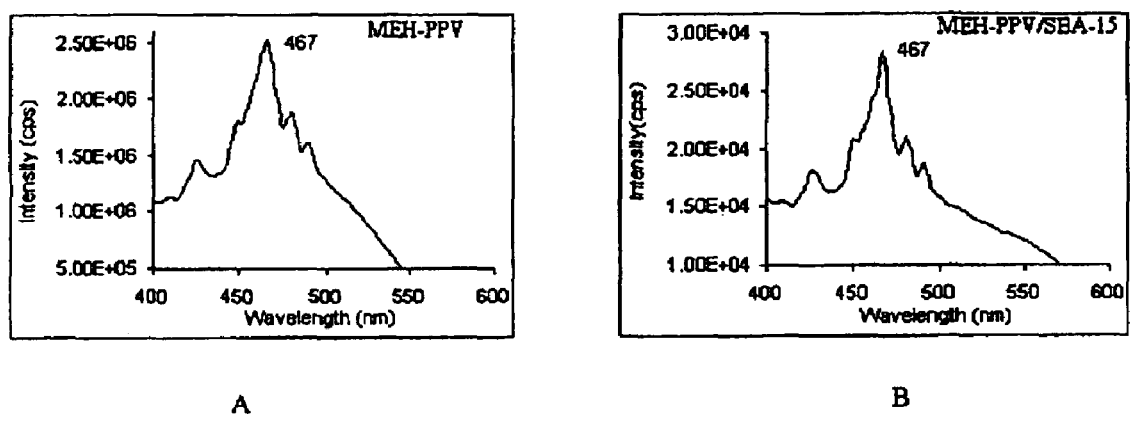
FIGS. 3A-3B represents excitation spectra of MEH-PPV and MEH-PPV/SBA-15 composite fibers.
Figure 4:
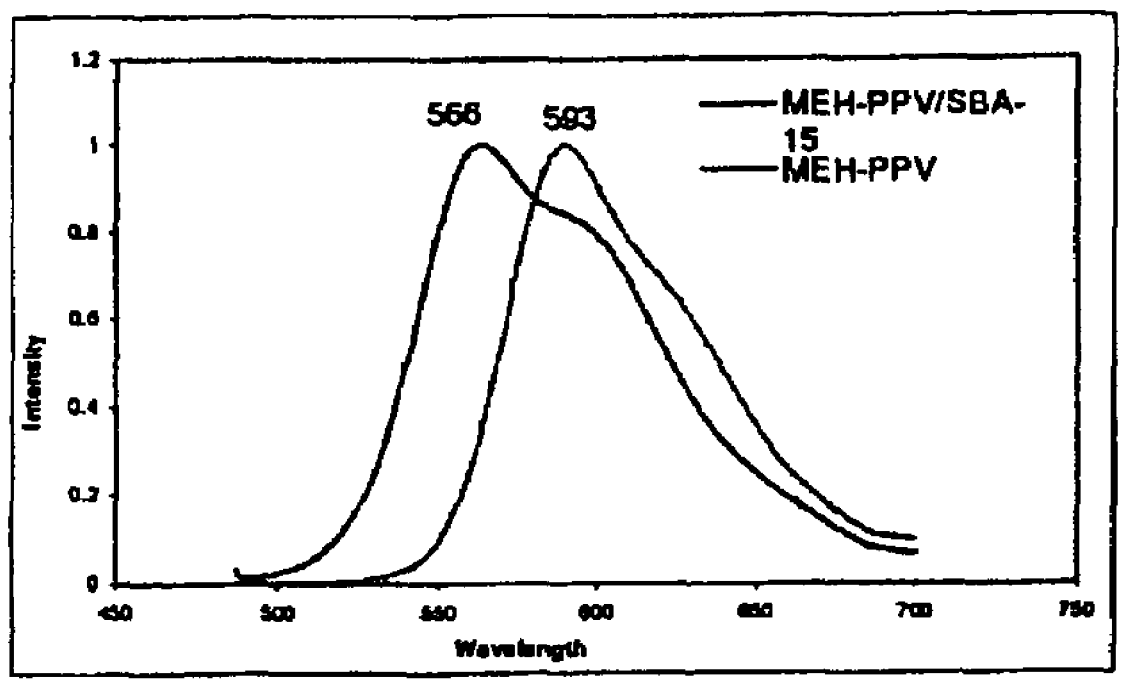
FIG. 4 represents emission spectra of MEH-PPV and MEH-PPV/SBA-15 composite fibers.
Figure 5:
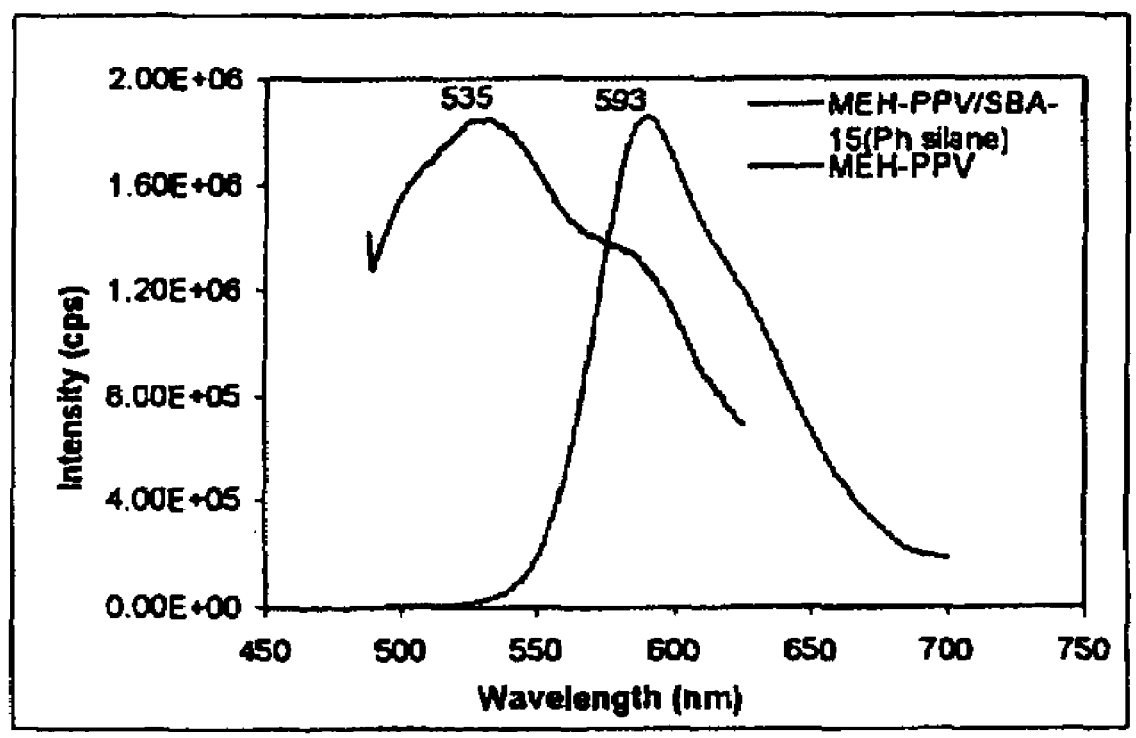
FIG. 5 represents emission spectra of MEH-PPV and MEH-PPV/SBA-15 with Phenyl silane.

FIG. 2 shows a few images of the MEH-PPV/SBA-15 composite fibers obtained. The presence of SBA-15 fibers was confirmed by SEM/EDAX analysis. An important result of electrospinning both the polymer MEH-PPV and SBA-15 materials together was, that the fluorescence of MEH-PPV had blue shifted in the composite fibers. The shift in the fluorescence was quantified by fluorescence spectroscopy. FIG. 4 shows the emission spectra of the pure MEH-PPV fibers and MEH-PPV/SBA-15 composite fibers. To study the effect of other hydrophobic or hydrophilic moieties in the composite fibers, different organosilanes were used in the mesoporous material gel. Phenyltrimethoxy silane, p-aminophenyltrimethoxysilane, phenyltrimethylchlorosilane (PTMC S) and trimethylchlorosilane (TMC S) were partially substituted in the gel. While PTMCS and TMCS did not affect the luminescence property of MEH-PPV, partial substitution of phenyltrimethoxy silane blue shifted the fluorescence even further rendering a green fluorescence of the composite fibers. The shift in fluorescence is shown in the emission spectra in FIG. 5. Excitation spectra of the MEH-PPV fibers and the composite samples remained essentially the same suggesting that the chromophore is still the same in the composite fibers (FIG. 3). Dissolving the fibers shifted the fluorescence almost close to the MEH-PPV emission also suggesting that no chemical change has occurred in the polymer. The shift in emission in the composite samples is believed to be due to prevention of aggregation in MEH-PPV fibers when electrospun along with SBA-15.

Figure 6:
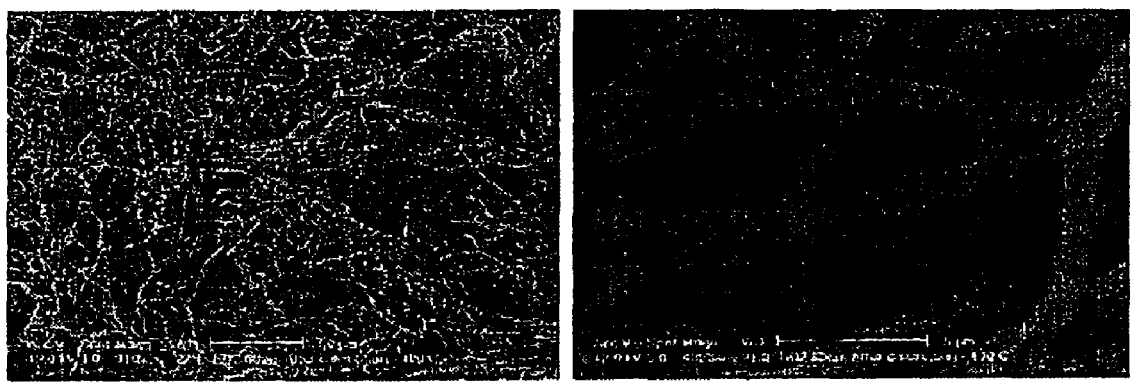
FIGS. 6A-6B represents scanning electron micrograph images of $TiO_2$ fibers obtained after calcination.
Figure 7:
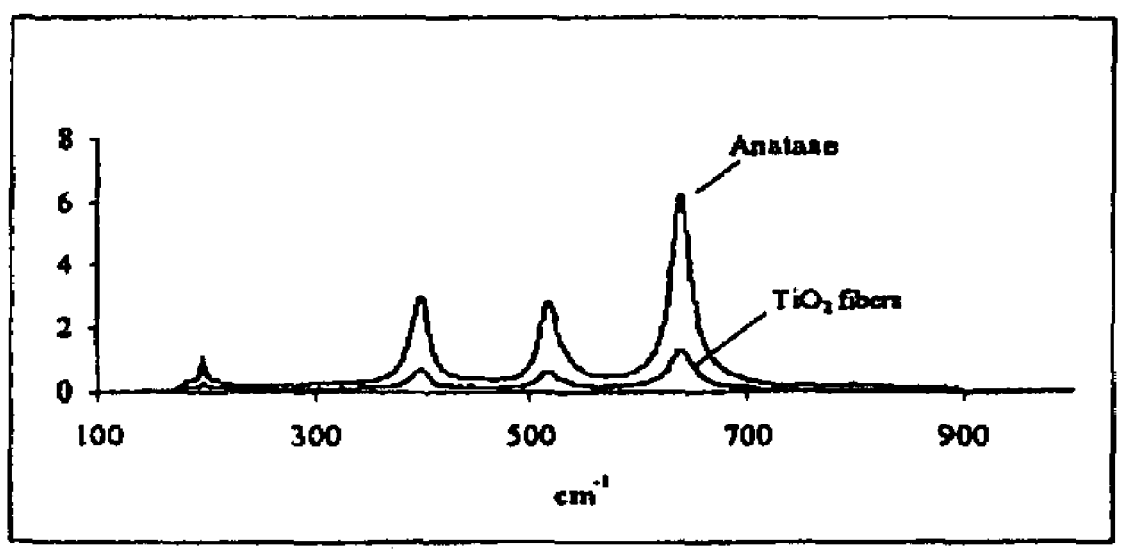
FIG. 7 represents Raman spectra of $TiO_2$ fibers.

FIG. 6 shows the SEM images of the $TiO_2$ fibers obtained after calcination. Raman spectroscopy confirmed the presence of anatase in the fibers (FIG. 7).

Figure 8:
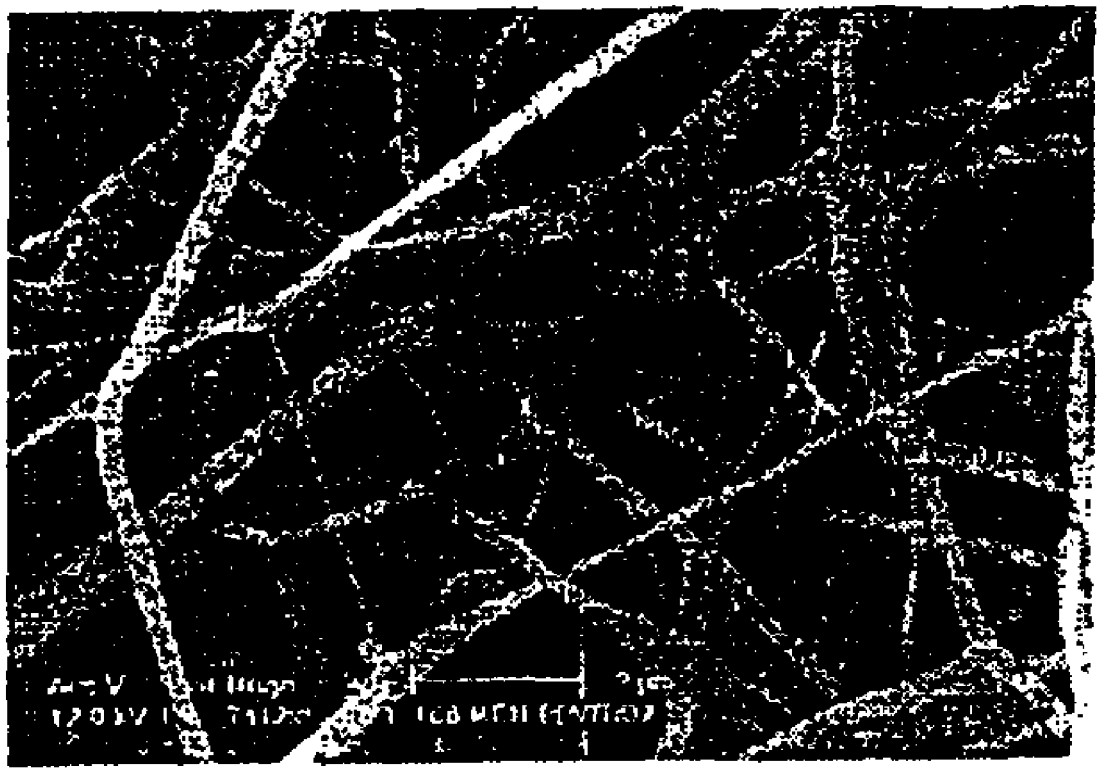
FIG. 8 represents scanning electron micrograph images of $TiO_2$/MEH-PPV composite fibers.

Composite fibers of TiO$_2$ and MEH-PPV show the presence of fibers with two different morphologies. This suggests the presence of both the materials in the composite fibers. FIG. 8 shows the fibers obtained with MEH-PPV and TiO$_2$ electrospun together.

Figure 9:
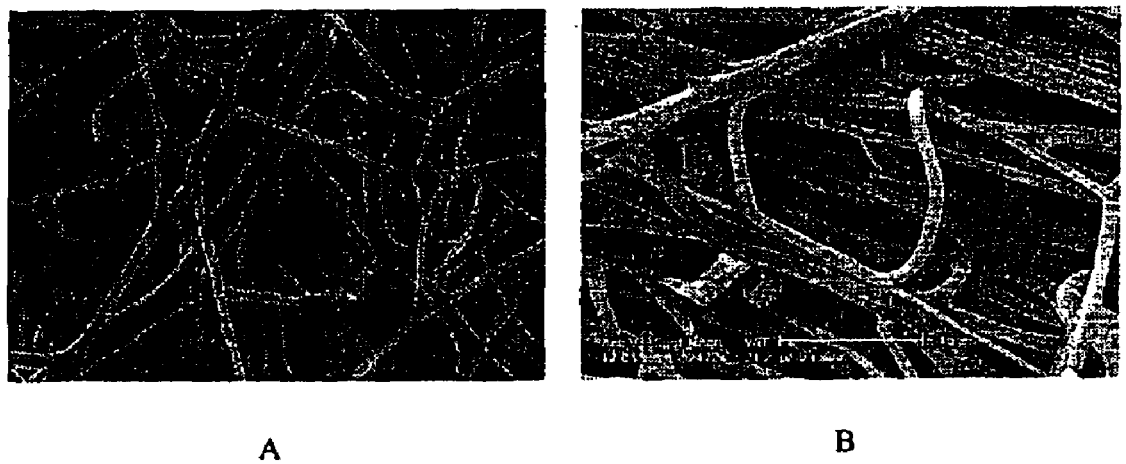
FIGS. 9A-9B represents scanning electron micrograph images of composite fibers of PEI and SBA-15 with (A) and without (B) a crosslinker.

Composite fibers of PEI/SBA-15 formed a web like structure. The presence of a dye rendered the composite network fluorescent. FIG. 9 shows the SEM image of the composite fibers obtained with PEI and SBA-15 electrospun together.

What is claimed is:

1. A method of forming a network of fibers comprising,
   preparing a mesoporous molecular sieve precursor material consisting of a surfactant and a silica source,
   providing a first conducting solution from a first reservoir to a first conducting solution introduction device and a second conducting solution from a second reservoir to a second conducting solution introduction device, wherein said first reservoir comprises a polymer material, and said second reservoir comprises the mesoporous molecular sieve precursor material,
   establishing an electric field between said first and second conducting solution introduction devices and a target,
   forming a jet stream of said first and second conducting solutions,
   applying an electric current to said jet to form fibers,
   forming a network comprising mesoporous molecular sieve fibers and polymer fibers, and,
   collecting said fibers on a target.

2. The method of claim 1, wherein said first and second conducting solution introduction devices are selected from the group consisting of a metal needle with a flat tip and a glass pipette.

3. The method of claim 1, wherein said electric field ranges from about 5 kilovolts to about 100 kilovolts.

4. The method of claim 3, wherein said electric field is about 20 kilovolts.

5. The method of claim 1, wherein said first and second conducting solutions are fed to said first and second conducting solution introduction devices at a controlled rate.

6. The method of claim 5, wherein said rate ranges from about 0.1 to about 1000 microliters/minute.

7. The method of claim 6, wherein said rate is controlled by maintaining said first and second conducting solutions at a constant pressure or constant flow rate.

8. The method of claim 1, wherein said target is a metal screen, mechanical reel, aerodynamic current or an aqueous liquid.

9. The method of claim 1, wherein the polymer material is selected from the group consisting of poly(lactic acid) (PLA), poly(glycolic acid) (PGA), poly(ethylene oxide), nylon, polyesters, polyamides, poly(amic acids), polyimides, polyethers, polyketones, polyurethanes, polycaprolactones, polyacrylonitriles, polyaramides, conjugated polymers such as the electroluminescent polymer, poly(2-methoxy, 5 ethyl (2' hexyloxy) para-phenylene vinylene) (MEH-PPV), polyphenylene-vinylenes, polyarylene-vinylenes, polythienolene-vinylenes, polypyrrolo-vinylenes, pol yheteroarylene-vinylenes, polyanilines, polyphenylenes, polyarylenes, polythiophenes, polypyrroles, polyheteroarylenes, polyphenylene-ethynylenes, polyaryleneethynylenes, polythienoethynylenes, polyheteroarylene-ethynylenes, and mixtures thereof.

10. The method of claim 1, wherein said surfactant is selected from the group consisting of pluronic P-123, pluronic P-127, pluronic F-77, pluronic P-104, pluronic F-38, pluronic L-121, Vitamin E TPGS, Tergitols, Triton-X, polyethylene glycol, alkyl ammonium halides, alkyl amines and mixtures thereof.

11. The method of claim 1, wherein said fiber has a diameter ranging from about 10 nanometers up to about 1,000 nanometers.

12. The method of claim 1, wherein said silica source is tetramethylorthosilicate.

* * * * *